Dec. 2, 1958   C. J. WERNER   2,862,623
FILTER
Filed May 18, 1955

INVENTOR.
Calvin J. Werner
BY
His Attorney

United States Patent Office

2,862,623
FILTER

Calvin J. Werner, Dayton, Ohio, assignor to General Motors Corporation, Detroit, Mich., a corporation of Delaware Application May 18, 1955, Serial No. 509,219

2 Claims. (Cl. 210—445)

This invention relates to filters and is particularly concerned with filters for use in conjunction with internal combustion engines and the like.

In an internal combustion engine, such as an automotive engine, it is desirable to have a fuel filter interposed between the fuel supply and the carburetor for removing particles of dirt from the fuel prior to the time that the fuel enters the carburetor and passes through the jets thereof. Such a filter also acts as a fluid separator and eliminates water from the fuel when the water is present in small quantities whereby the operation of the internal combustion engine is generally improved.

In Patent No. 2,628,721 a fluid filter is shown wherein a porous metal element is utilized which is not removable. In this case, when dirt fouls the filter, the entire device must be replaced. This procedure is expensive and present day usage demands an efficient filter that is cleanable.

It is therefore the main object of this invention to provide an inexpensive and efficient filter for fluids such as fluid fuels wherein the filter is easily disassembled and reassembled with a minimum of effort.

In carrying out the above object it is a further object of the invention to provide a fluid filter wherein a single assembly bolt holds all of the parts of the filter together and wherein removal of said bolt permits complete disassembly of the filter for cleaning.

A still further object of the invention is to provide a sealing element within said filter and around said bolt which element seals the bolt against leakage therearound with respect to the filter casing and also to the filter element.

Further objects and advantages of the present invention will be apparent from the following description, reference being had to the accompanying drawings, wherein a preferred form of the invention is clearly shown.

Figure 2:
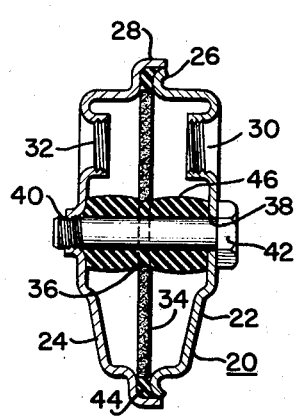
Figure 2 is a sectional view taken on line 2—2 of Figure 1 showing the sealing element in sealing position.
Figure 1:
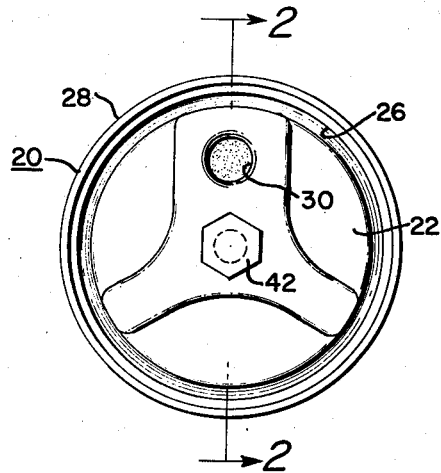
Figure 1 is a plan view of a fluid filter.
Figure 3:
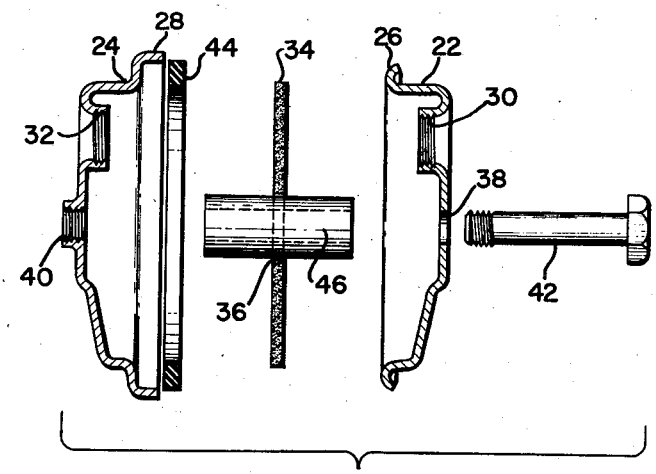
Figure 3 is an expanded view of the several parts of the filter partly in cross section.

A filter 20 as disclosed herein comprises two shell members or elements 22 and 24 which are telescopically engaged in assembled position as shown in Figure 2 wherein a flanged lip 26 on the element 22 fits within a cup-like flange 28 on the element 24. The elements 22 and 24 are provided with tapped openings 30 and 32 respectively into which tubing fittings may be inserted which openings 30 and 32 act as inlet and outlet to the filter 20 respectively. The filter element per se is shown at 34 and comprises a porous plate made from suitable porous material, for example, porous metal material, fabricated from sintered non-compacted metal powders wherein the element may be bronze, tin coated bronze, etc., or any other metal or porous material which is not deleteriously affected by the fuel being filtered. The filter plate 34 has a central aperture 36 therethrough which is aligned, when the device is assembled, with apertures 38 and 40 in the elements 22 and 24 respectively. The aperture 38 is of large enough diameter to permit the passage of a bolt 42 therethrough while the aperture 40 is preferably threaded so that the threads of the bolt 42 may engage the threaded aperture 40 during the assembly operation, instead of a threaded operation an external nut (not shown) may be used.

The filter element or plate 34 has a diameter greater than the inner diameter of the members 22 or 24, but less than the inner diameter of the cup-shaped flange 28 on the member 24. Thus, the porous element 34 may rest upon a portion of the cup-shaped flange 28 of the element 34. Surrounding the element 34 when in position on the flange 24 is an elastomeric gasket 44 which has an inner diameter slightly greater than the outer diameter of the porous element 34 and an outer diameter slightly less than the inner diameter of the cup-shaped flange 28. The thickness of the gasket 44, however, is slightly greater than the thickness of the filter element 34 so that when the parts are assembled the flange 26 of the element 22 tends to compress the gasket 44 into tight sealing engagement with the outer periphery of the filter element 34 and with the engaging surfaces of the flanges 26 and 28. This may be accomplished when the bolt 42 is drawn up tightly as described hereinafter.

In order to prevent leakage around the bolt 42 a tubular elastomeric sealing member 46 is provided which has a bore therethrough sufficient to freely pass over the bolt 42 and which has an outer diameter slightly less than the diameter of the aperture 36 in the filter element 44. The overall free length of the sealing member 46 is slightly greater than the distance between the inner walls of the shell-like members 22 and 24 when the device is fully assembled. When the sealing member 46 is placed around the bolt 42, and the bolt is drawn up in the threads in the aperture 40, the overall length of the sealing member 46 is reduced and the member is compressed axially so as to bulge slightly outwardly as shown in Figure 2 whereby the sealing member 46 seals against the walls of aperture 36 in the porous member 34 and likewise seals around the bolt at the apertures 38 and 40.

In this manner, by the simple expedient of drawing up the bolt 42 tightly, it is possible to completely assemble the filter in a single operation and to tightly seal all passageways therein so that fluid which enters the filter through the inlet 30 must pass through the porous element 34 prior to the time that it can exit through the outlet 32 thereof. Similarly, and by reverse procedure, when it is desired to clean the filter, removal of the bolt 42 permits complete disassembly of the device for cleaning purposes whereupon the filter may be quickly reassembled by the simple procedure of tightening the bolt 42.

The elastomeric gasket and the sealing member 46 are preferably made from some suitable rubber-like material which is resistant to the action of the fluid to be filtered. In the case of fuel oil or gasoline, we have found that butadiene-acrylonitrile copolymer types of elastomers are highly suitable. Certain oils may be adequately sealed with such materials as thiokol, polychloroprene, etc., while some fluids may be sealed with natural rubber, etc. In all cases the material to be used should be determined in view of the fluid to be filtered. Specific dimensions for one filter are as follows: the dimension between the inner faces of elements 22 and 24 at the center thereof is .945". The free length of the elastomeric member 46 is 1.125", its outer diameter is 15/32". The central aperture 36 in the filter plate 34 is .49". The outer gasket 44 is .125" thick while the thickness of the filter plate 34 is .065". From these dimensions it will be seen that upon compression of the elastomeric material of the gasket 44 that considerable flow of the material is experienced to seal the several parts. Also that the tubular member 46 is compressed axially thereof to seal against the elements 22 and 24 and to also seal around the periphery of the aperture in the filter element 34.

While the forms of embodiment of the invention as herein disclosed constitute preferred forms, it is to be understood that other forms might be adopted, as may come within the scope of the claims which follow.

What is claimed is as follows:

1. A filter assembly comprising two telescopically engaged shell members having inlet and outlet apertures therethrough, a porous filter element of sheet-like form interposed between said members adjacent the telescopically engaged portions of said members and having a diameter greater than the inside diameter of either shell member and less than the diameter of the telescopic portions thereof, sealing means disposed around the outer peripheral edge of said element and between said members at the telescopic portions thereof, a bolt passing through aligned apertures in said members and said filter element, an elastomeric tubular seal surrounding said bolt and passing through the aperture in said elements and having a free length greater than the distance between said members whereby when said elements are drawn into tight engagement by said bolt that said tubular seal is bulged to seal the apertures in said member and to bulge outwardly to seal the aperture in said filter element and simultaneously to cause the peripheral sealing means to seal the filter element to the members.

2. A filter assembly, comprising in combination; two shell members including spaced aligned apertures therethrough in opposed faces thereof, a plate-like filter element sealed around its outer periphery between said members and having a central aperture aligned with and spaced from the apertures in said members, a clamping bolt passing through said three apertures for clamping the members together with the filter element therebetween, and an elastomeric tube carried on said bolt and having a greater free length than the distance between the opposed faces of said members and of slightly less diameter than the diameter of the aperture in said element and greater than the diameter of the apertures in said members, said tube being axially compressed by the members when they are clamped together by said bolt for sealingly engaging the opposed faces and the bolt and for simultaneously peripherally engaging the aperture in said element in sealing relation thereto whereby the assembled shell members form two compartments separated by said filter element.

References Cited in the file of this patent

UNITED STATES PATENTS

| | | |
|---|---|---|
| 1,216,219 | Elster | Feb. 13, 1917 |
| 1,472,896 | Alsop | Nov. 6, 1923 |
| 1,913,513 | Rossman et al. | June 13, 1933 |
| 2,277,885 | Rodanet | Mar. 31, 1942 |
| 2,628,721 | Mathews | Feb. 17, 1953 |
| 2,646,884 | Findley | July 28, 1953 |
| 2,760,646 | Emerson | Aug. 28, 1956 |